US010989832B2

(12) United States Patent
Ewe et al.

(10) Patent No.: US 10,989,832 B2
(45) Date of Patent: Apr. 27, 2021

(54) PAD ALIGNMENT WITH A MULTI-FREQUENCY-BAND AND MULTI-WINDOW SEMBLANCE PROCESSING

(71) Applicant: Halliburton Energy Services, Inc., Houston, TX (US)

(72) Inventors: Wei-Bin Ewe, Singapore (SG); Ruijia Wang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 63 days.

(21) Appl. No.: 16/504,574

(22) Filed: Jul. 8, 2019

(65) Prior Publication Data

US 2021/0011189 A1    Jan. 14, 2021

(51) Int. Cl.
| | |
|---|---|
| *G01V 3/38* | (2006.01) |
| *G01V 3/02* | (2006.01) |
| *E21B 49/00* | (2006.01) |
| *E21B 47/002* | (2012.01) |

(52) U.S. Cl.
CPC ............. *G01V 3/38* (2013.01); *E21B 47/002* (2020.05); *E21B 49/00* (2013.01); *G01V 3/02* (2013.01)

(58) Field of Classification Search
CPC .......... G01V 3/38; G01V 3/02; E21B 47/002; E21B 49/00
See application file for complete search history.

(56) References Cited

U.S. PATENT DOCUMENTS

| | | | |
|---|---|---|---|
| 4,468,623 A | | 8/1984 | Gianzero et al. |
| 4,517,835 A | * | 5/1985 | Kerzner ................ E21B 47/026 324/367 |
| 4,541,275 A | * | 9/1985 | Kerzner .................. G01V 3/38 702/7 |

(Continued)

FOREIGN PATENT DOCUMENTS

| | | |
|---|---|---|
| WO | 2018084847 | 5/2018 |
| WO | 2018231234 | 12/2018 |

OTHER PUBLICATIONS

TerraSciences, TerraStation II Overview, Versatile, fully integrated software for exploration and production, 2011.

(Continued)

*Primary Examiner* — Akm Zakaria
(74) *Attorney, Agent, or Firm* — John Wustenberg; C. Tumey Law Group PLLC

(57) ABSTRACT

A method and system for pad alignment may comprise disposing a downhole tool into a borehole, taking a measurement with the electrode with at least one operating frequency, correcting the measurement to account for local formation dip, constructing a window with a predetermined size H, identifying a number of adaptive filters to be utilized, extracting one or more frequency components from the measurement with the adaptive filters, identifying a semblance value of a reference dataset and a target dataset, assembling the semblance values for the reference dataset and the target dataset, identifying the semblance values of the reference dataset and target datasets over the range of relative pad shifts, identifying a pad shift, and forming one or more images of the pad shirt or the semblance of the reference dataset and target data set. The system may comprise a mandrel, one or more pads, and electrodes.

20 Claims, 7 Drawing Sheets

(56) References Cited

U.S. PATENT DOCUMENTS

| | | | |
|---|---|---|---|
| 5,198,770 A | 3/1993 | Decorps et al. | |
| 6,125,203 A * | 9/2000 | Keskes | G01V 3/38 |
| | | | 382/171 |
| 6,450,258 B2 * | 9/2002 | Green | E21B 23/04 |
| | | | 166/250.17 |
| 9,523,784 B2 | 12/2016 | Orban | |
| 2012/0192640 A1 * | 8/2012 | Minh | G01V 11/005 |
| | | | 73/152.16 |
| 2015/0338540 A1 * | 11/2015 | Bespalov | G01V 3/20 |
| | | | 324/355 |
| 2016/0032721 A1 * | 2/2016 | Hsu | G01N 21/534 |
| | | | 702/8 |

OTHER PUBLICATIONS

International Search Report and Written Opinion for Application No. PCT/US2019/040863, dated Apr. 7, 2020.

* cited by examiner

PAD ALIGNMENT WITH A MULTI-FREQUENCY-BAND AND MULTI-WINDOW SEMBLANCE PROCESSING

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress. During drilling operations borehole imager tools may be particularly important in learning about thin beds, fracture locations, and low resistivity formations. Measuring resistivity may include frequency components at formation boundaries. Using data from an appropriate frequency range may allow for estimating the correct pad/depth adjustment. Existing processing that uses full-frequency data may be influenced by noises outside the dominant frequency of the target dips or fractures, thus such methods may provide biased estimates.

BRIEF DESCRIPTION OF THE DRAWINGS

For a detailed description of the preferred examples of the disclosure, reference will now be made to the accompanying drawings in which.

DETAILED DESCRIPTION

The present disclosure relates generally to a system and method for correcting images from a downhole tool. In image data, the higher frequency components in the signal may be used to increase the accuracy of pad alignment but may have aliasing issues and may be overshadowed by the low frequency components. Low frequency components of the data may provide alias-free estimates but may have low accuracy. A pad alignment workflow may use adaptive filters driven by the input data to extract needed frequency components and combine low frequency and high frequency component results. In examples, semblance values obtained from different filtered data may be combined to provide a stable and accurate estimate of depth shift. Multiple steps with multi-scale depth windows may also be utilized to balance the method stability and the depth resolution. Additionally, quality control plots may be derived from the semblance map and allow a user to check the quality of the results.

Figure 1:
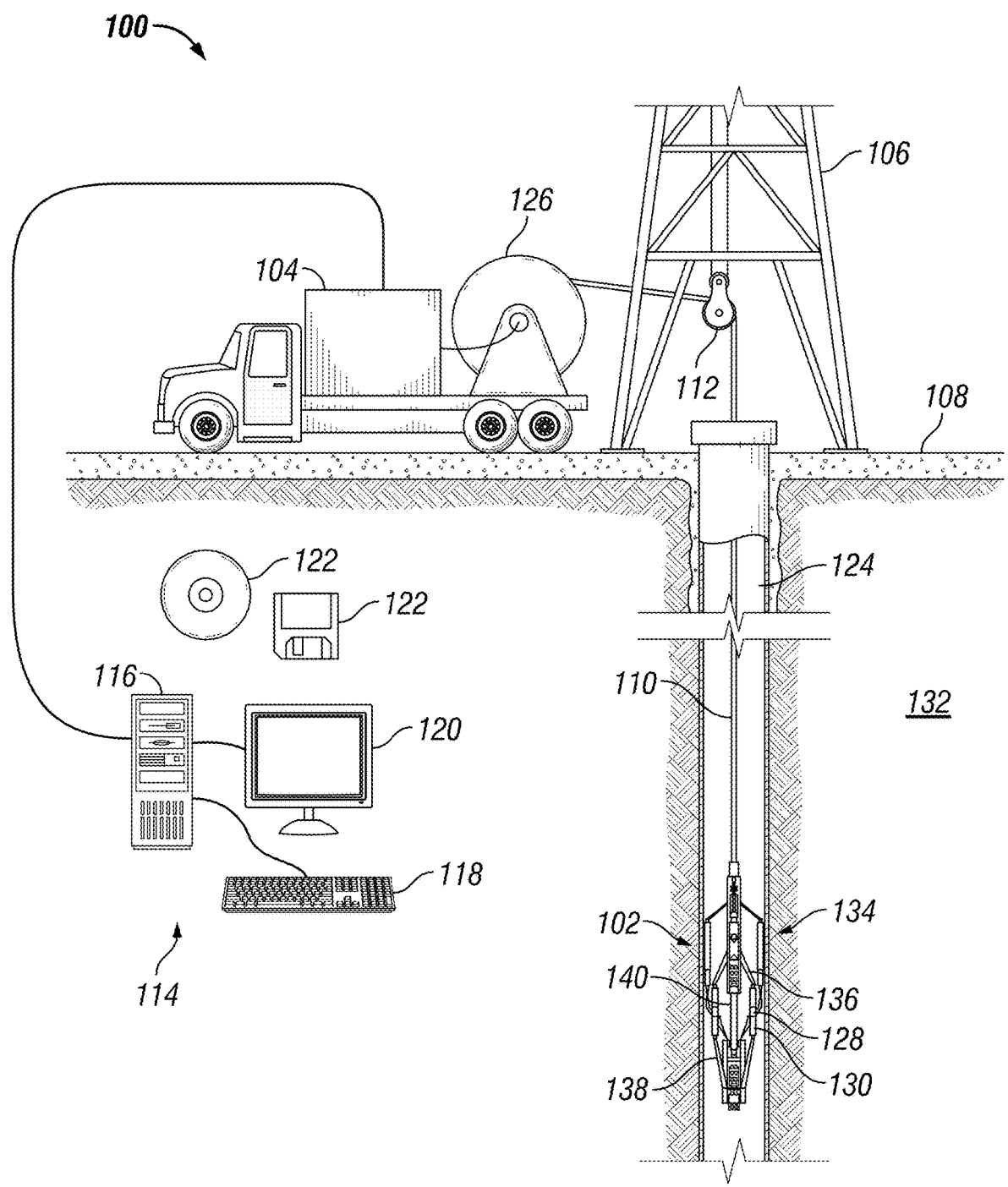
FIG. 1 illustrate an example of a well measurement system.

FIG. 1 illustrates a cross-sectional view of a well measurement system 100. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high-resolution resistivity image of formation 132 immediately surrounding borehole 124. This high-resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

In examples, rig 106 includes a load cell (not shown) which may determine the amount of pull on conveyance 110 at the surface of borehole 124. Information handling system 114 may include a safety valve which controls the hydraulic pressure that drives drum 126 on vehicle 104 which may reel up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may include a plurality of electrodes, such as button array 128. Downhole tool 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of downhole tool 102 through upper arm 136 and lower arm 138. It should be noted that mandrel 140 may be defined as the supporting structure of downhole tool 102 which may act as a platform for any peripheral (e.g., upper arm 136, lower arm 138, conveyance 110, etc.) to attach to downhole tool 102. Upper arm 136 and lower arm 138 may extend pad 134 away from downhole tool 102. In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

During operations, an operator may energize an individual electrode, or any number of electrodes, of button array 128. A voltage may be applied between the electrode and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a resistivity image of formation 132, a current may be transmitted from at least one transmitter electrode and return to return electrode 130. These two electrodes may be referred to as the current electrodes. Then, the voltage drop across a pair of the electrodes of button array 128 may be measured and used to estimate the impedance of formation 132. In these alternative implementations, button electrodes may be referred to as voltage electrodes or monitor electrodes. Proposed method may operate in any of the two designs above or any other similar oil-based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
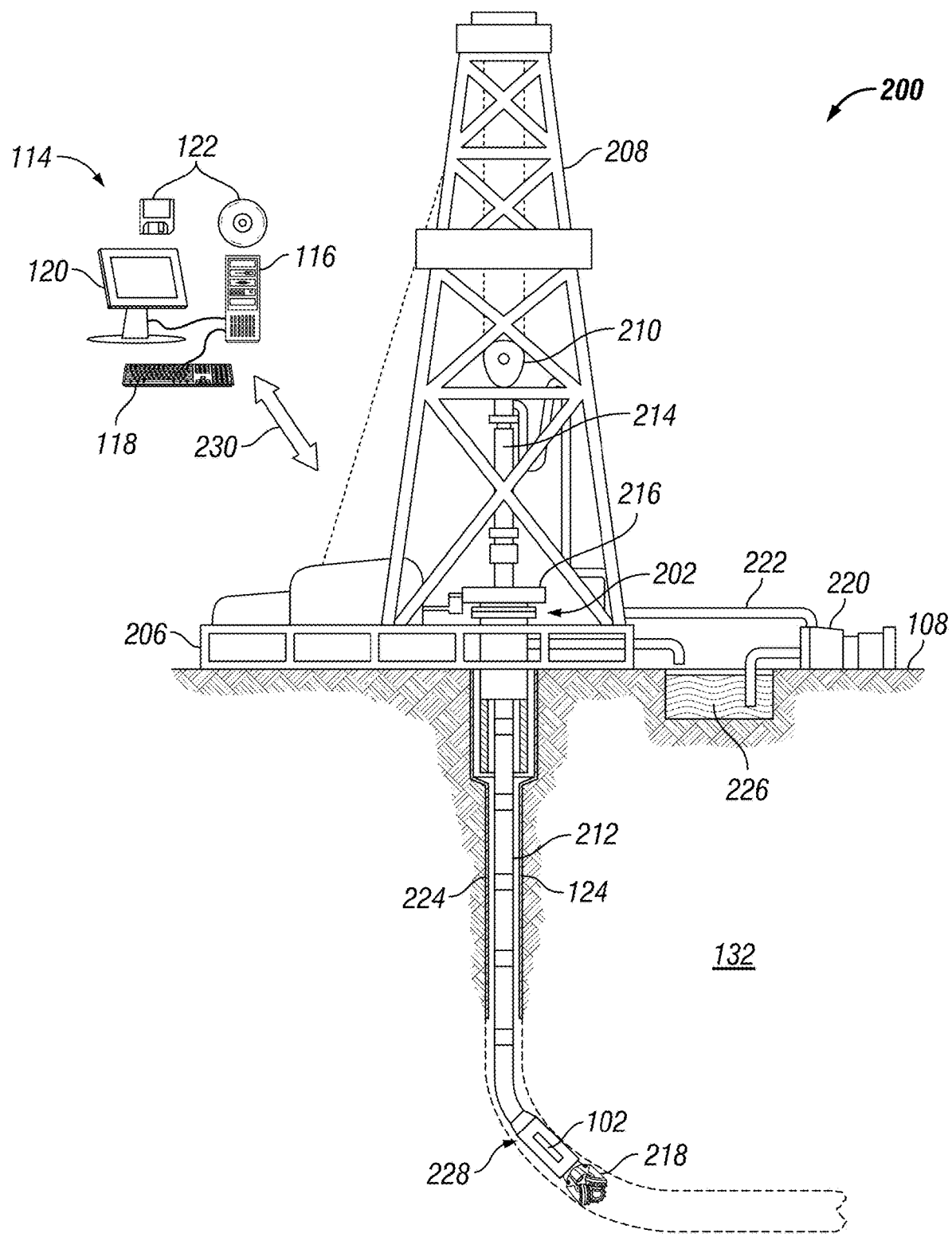
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 202 into formation 132 from surface 108. As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further include downhole tool 102 (Referring to FIG. 1). Downhole tool 102 may be disposed on the outside and/or within bottom hole assembly 228. Downhole tool 102 may include test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114 (Referring to FIG. 1), which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Figure 3:
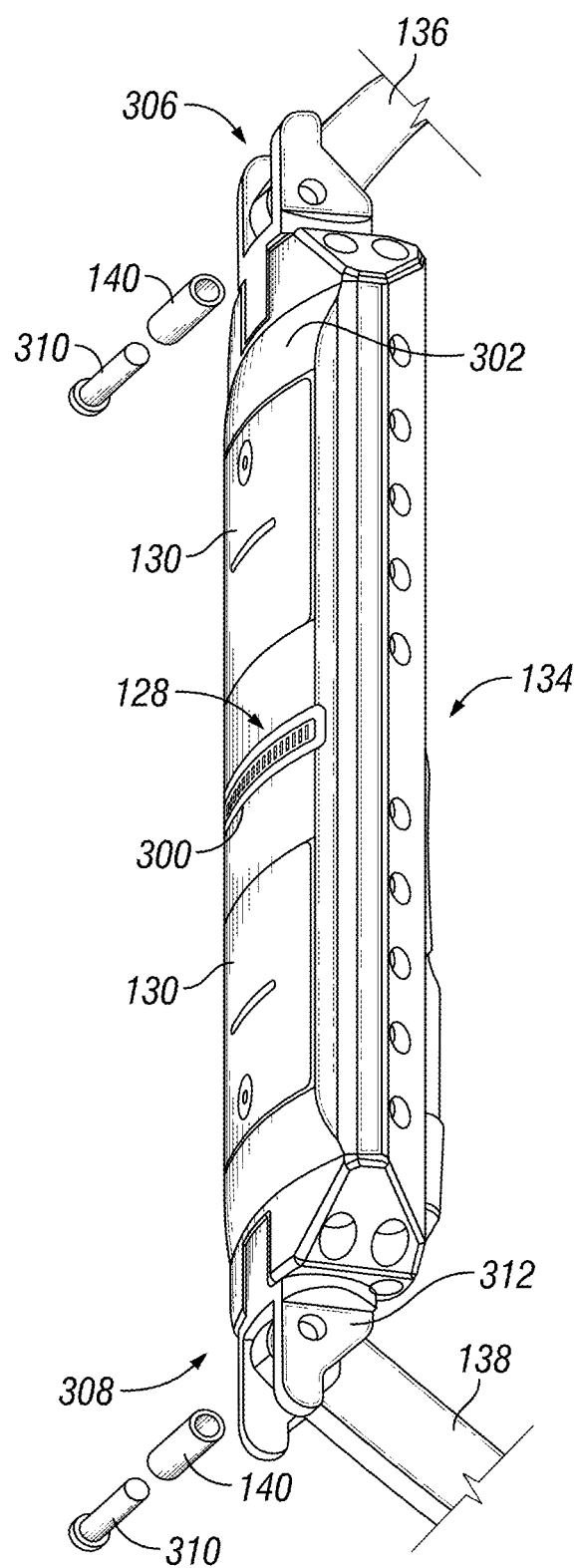
FIG. 3 illustrates an example of a pad.

FIG. 3 illustrates an example of pad 134. It should be noted that pad 134 may be connected to downhole tool 102 (e.g., referring to FIGS. 1 and 2). Pad 134 may serve to place button array 128 and/or return electrode 130 in contact with or in close proximity to borehole 124. Pad 134 may include a button array 128, a return electrode 130, a guard 300, and a housing 302. In examples, there may be a plurality of button arrays 128. In examples, return electrode 130 and button array 128 may be disposed directly on downhole tool 102. Button array 128 may include an injector electrode 304, wherein injector electrode 304 may be a sensor that senses impedance of formation 132. It should be noted that injector electrode 304 may be a button electrode. There may be any suitable number of injector electrodes 304 within button array 128 that may produce a desired, predetermined current. Without limitation, the range for a suitable number of injector electrodes 304 within button array 128 may be from about one injector electrode 304 to about one hundred injector electrodes 304. For example, the range for a suitable number of injector electrodes 304 within button array 128 may be from about one injector electrode 304 to about twenty-five injector electrodes 304, from about twenty-five injector electrodes 304 to about fifty injector electrodes 304, from about fifty injector electrodes 304 to about seventy-five injector electrodes 304, or from about seventy-five injector electrodes 304 to about one hundred injector electrodes 304.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 304 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 304 may be inversely proportional to the impedance seen by that injector electrode 304. This impedance may be affected by the properties of formation 132 and the mud directly in front of each injector electrode 304. Therefore, current emitted by each injector electrode 304 may be measured and recorded in order to obtain an image of the resistivity of formation 132.

In examples, a current may be transmitted from injector electrode 304 and return to return electrode 130. These two electrodes may be referred to as the current electrodes. Then, the voltage drop across button array 128 may be measured and used to estimate the impedance of formation 132. In these alternative implementations, injector electrodes 304 may be referred to as voltage electrodes or monitor electrodes. Proposed methods may be implemented on downhole tool 102 which may be disposed on a wireline in a wireline operation (e.g., referring to FIG. 1), disposed on a bottom hole assembly 228 in a LWD or MWD operation (e.g., referring to FIG. 2), or any other similar oil-based mud resistivity imager tool and operation without any limitations. In the rest of the text, downhole tool 102 may be an disposed on a wireline without any loss of generality to utilization of the method with other tools and operations. Guard 300 may help to focus most of the current produced by button array 128 into formation 132 radially. Guard 300 may be disposed around button array 128. Guard 300 may include the same potential as button array 128.

In examples, housing 302 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 302 may be a metal plate. Housing 302 may be connected through upper arm 136 to downhole tool 102 (e.g., referring to FIG. 1). An insulating material may be used to fill the remaining portions of pad 134. In examples, ceramics may be used as the insulating material to fill the remaining portions of pad 134.

An impedance value may be calculated through the current transmitting between an injector electrode 304 and formation 132 for each injector electrode 304. The voltage between button array 128 and return electrodes 130 may be measured and divided by the transmitted current to produce a value for the impedance seen by each injector electrode 304. Most of the transmitted current may be returned to return electrodes 130 although some portions of it may return through housing 302 and downhole tool 102 (referring to FIG. 1).

Pad 134 may take resistivity measurements that may include frequency components at formation boundaries. The ability to manipulate frequency ranges during measurement operations may allow for correcting measurements at any depth within borehole 124 (e.g., referring to FIG. 1). Currently, full-frequency measurements may be influenced by noise outside the domination frequency of target dips or fractures within formation 132 (e.g., referring to FIG. 1). However, a selective window-based method using high frequency measurements may increase accuracy of measurement corrections.

During measurement operations higher frequency components from resistivity data may be used to increase the accuracy of pad alignment but may have aliasing issue, which may be overshadowed by low frequency components. Low frequency components may provide alias-free estimates, but accuracy may be low. As discussed below, adaptive filters driven by the input data may extract needed frequency components and combine low frequency and high frequency components results. The semblance values obtained from different filtered data may be combined to provide a stable and accurate estimate of depth shift. In addition, multi-steps with multi-scale depth window may also be utilized to balance stability and depth resolution of the measurements. Furthermore, quality control plots may be derived from the semblance map and may allow a user to check the quality of the results.

Figure 4A:
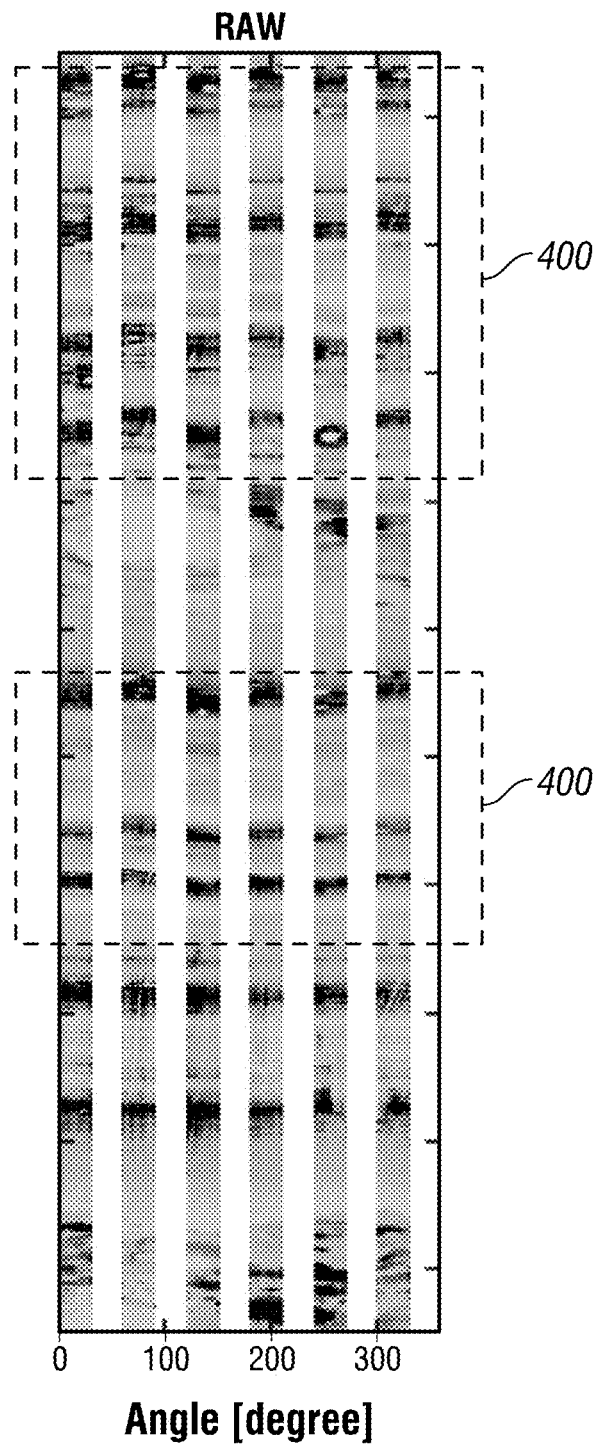
FIGS. 4A and 4B illustrate images from a downhole tool with misaligned areas.
Figure 4B:
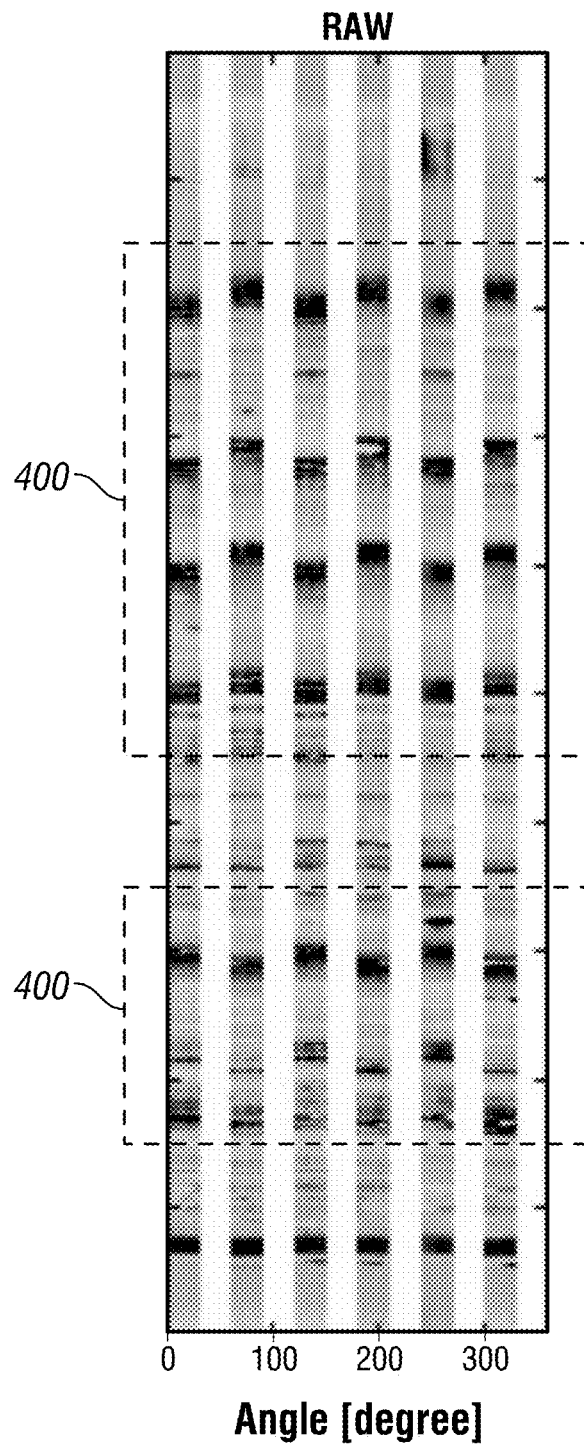

Referring back to FIG. 1, downhole tool 102 may be able to measure high resolution images with any number of pads 134. As illustrated in FIG. 1, there may be six pads 134 on downhole tool 102 with three pads 134 located at a first height and the other three pads 134 placed at a second height. Without limitation, the two sets of pads 134 may be separated by about 36 inches (91 centimeters). During operations, downhole tool 102 may be pulled out of borehole 124 at a constant speed. The depth difference of the logged data recorded by two different sets of pads 134 may be adjusted by adding/subtracting a depth difference. However, in practice, due to the various downhole conditions, the logging speed is not constant and sometime varies at different locations. The acceleration and deceleration in logging speed have caused misalignment in the images that cannot be removed easily by using direct depth shift and/or speed correction. FIGS. 4A and 4B illustrate misalignment areas 400 that may be caused by a misalignment in pad 134. A window-based pad alignment may correct the misalignment by further exploiting frequency components measured during resistivity measurements of formation 132 (e.g., referring to FIG. 1).

Resistivity data measured/logged during measurement operations may include a large number of frequency components. This may be found when crossing a formation boundary where the step change in resistivity data generate high frequency components. Information may be kept in different frequency components, which may be overshadowed by other frequency components and/or deteriorated by unwanted noise. In order to obtain useful information for these frequency components, adaptive filter may be applied to the raw data to extract the band of desired frequency components from the data. In examples, filtered data may be represented as:

$$\tilde{x}_m(f, h) = \sum_{s=-\frac{H}{2}}^{\frac{H}{2}} h_f(s)x_m(z-s) \quad (1)$$

where $x_m$ is the measured resistivity data of pad m, hf (s) is the adaptive filter with center frequency f and H is the size of the window that contains the formation boundary. The number of center frequency f to be used may be determined from the maximum frequency components contained in window H. The adaptive filter may be constructed as the following:

$$h_f = FFT^{-1}\left(\frac{(W * H_{ideal})(f)}{\max(|FFT(\tilde{x})|)^\alpha}\right) \quad (2)$$

where W is the window function, without limitation, such as Hamming, Blackman, Hideal, etc., which is may be a filter impulse response, $\tilde{x}$ is the input data and $\alpha$ is a number between 0 and 1, that may be determined empirically or through the SNR of the data within the window, utilized to control the contribution of raw data spectrum in the semblance computing. By using the data driven adaptive filter, the unneeded frequency components may be removed while the gain of the remaining components may be controlled.

Once the different bands of frequency components obtained from the adaptive filters, the semblance of the pad alignment between reference pads and target pads may be computed. In examples, downhole tool 102 may include six pads 134 or eight pads 134. In each case, half of pads 134 may be in one group and the other half of the pads 134 may be in a second group. For example, in a case of six pads 134 there may be a first group of three pads 134 and a second group of three pads 134. Without limitation, one group may be identified a reference pads and the other group may be identified as target pads, or vice-versa. Thus, the semblance of the pad alignment between reference pads and target pads may be computed as:

$$Semb(f, \Delta z) = \frac{\int_{-\frac{H}{2}}^{\frac{H}{2}} W_s(h)|\Sigma \tilde{x}_{reference}(f, z) + \tilde{x}_{target}(f, z + \Delta z)|^2 dz}{N\int_{-\frac{H}{2}}^{\frac{H}{2}} W_s(h)|\Sigma \tilde{x}_{reference}(f, z) + \tilde{x}_{target}(f, z + \Delta z)|^2 dz} \quad (3)$$

where $\Delta z$ is the relative shift of target pad and $W_s(h)$ is the semblance window weighting function. In Eq. (3), the reference pads have been chosen as upper pads and the target pads as lower pads for the sake of convenience and it is noted that the reference and target pads may be interchangeable. Additionally, in an example of six pads 134, a first group of pads identified as 1, 3, and 5 are positioned at 0, 120, and 240 azimuthal degrees in the borehole whereas a second group of pads 2, 4, and 6 are positioned at 60, 180, 300 degrees. In an example of eight pads 134, pads 1, 3, 5, and 7 are positioned at 0, 90, 180, 270 azimuthal degrees whereas pads 2, 4, 6, and 8 are positioned at 45, 135, 225, 315 azimuthal degrees. Eq. (3) utilizes a Bartlett window as the window weighting function. However, other window functions such as a confined Gaussian window may also be utilized.

The semblance of the pad alignment may be calculated iteratively over the different center band frequency f. All the computed semblance values of different values fmay be stacked to obtain the semblance of relative pad shift:

$$Semb(f, \Delta z) = \frac{1}{M}\sum_{m=1}^{M} Semb(f_m, \Delta z) \quad (4)$$

In examples, different weights for different center band frequency may also be applied based on empirical experience. Once the resultant semblance map is obtained, the relative pad shift of the target pads may be selected by:

$$\max_{\Delta z} Semb(\Delta z) \quad (5)$$

In examples, stacking of the semblance values of different center band frequencies may be performed by constructing a histogram of all semblance values and subsequently finding the relative pad shift based on the occurrence in the histogram.

It should be noted that the resulting semblance values or map obtained from Eq. (4) may be used as a quality control indicator of pad alignment. A user may setup one or two thresholds of semblance values for a different confidence value. The one or two thresholds of semblance values may be based on the overall response of the semblance values and determined from statistical values of the distribution of semblance value, for example, first threshold set as a 50 percentile and second threshold set as an 80 percentile. A high confidence value may be found when the semblance value associated with the depth-shift estimates is larger than the first threshold and the user may not need to check the results. A medium confidence value may be found when the semblance value is in between the first threshold and the second threshold, the user may double check if the alignments are good. A low confidence value may be found when the semblance value is lower than the second threshold, the algorithm may fail in delivering a qualified answer, which requires user's manual adjustments.

Figure 5:
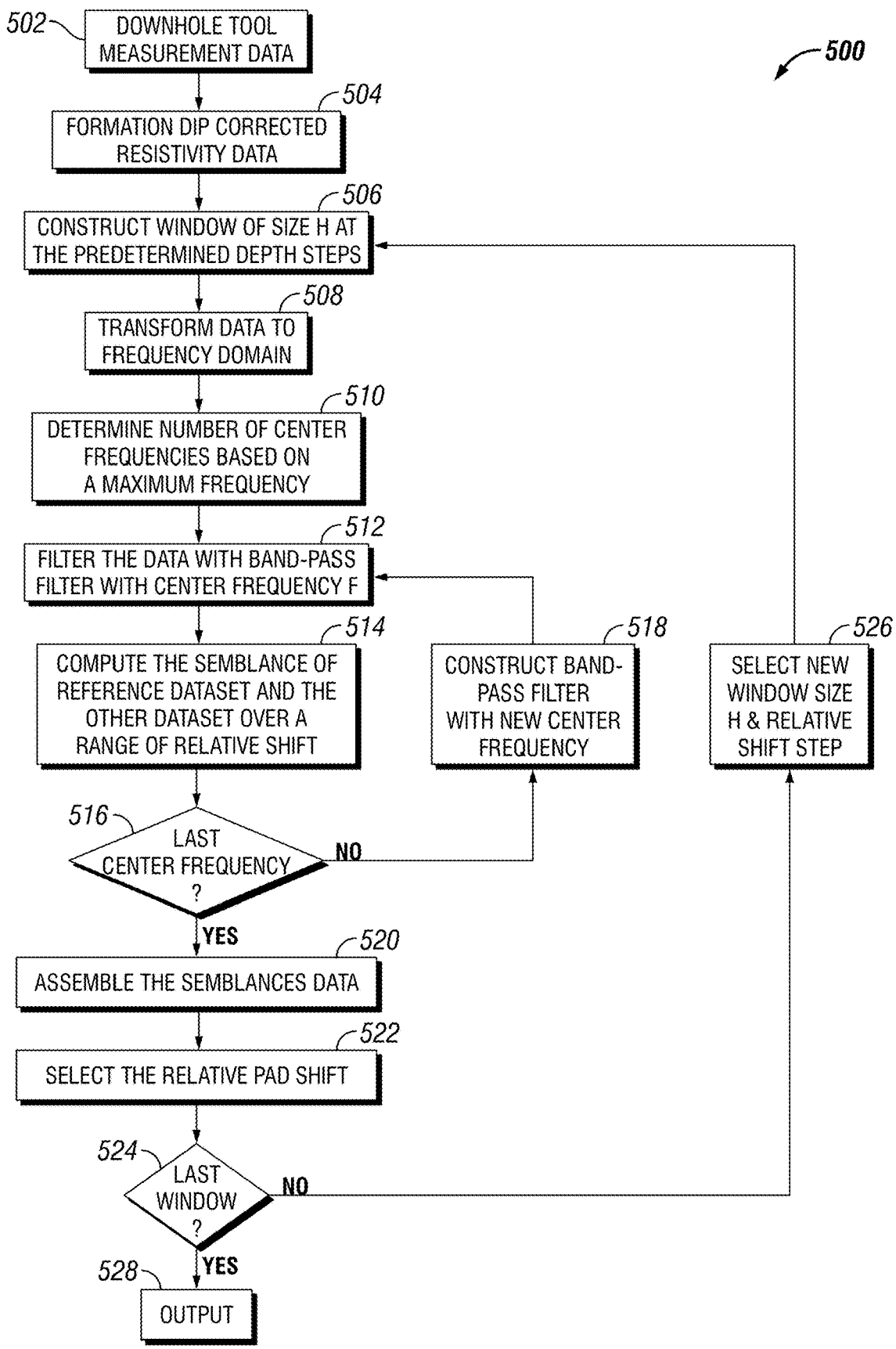
FIG. 5 illustrates a workflow for pad alignment.

FIG. 5 shows workflow 500 for pad alignment. As illustrated, workflow 500 may begin with block 502, where downhole tool 102 (e.g., referring to FIG. 1) measurement data is obtained during downhole measurement operations of formation 132 (e.g., referring to FIG. 1). Measurement operations may include wireline operations, logging while drilling (LWD) operations, or measuring while drilling (MWD) operations. The measurements from block 502 may be corrected in in block 504.

In block 504 formation dip corrected resistivity data is found from the measurement data in block 502. The formation dip correction is synonym to the determination of the local formation dip. Generally, it should be a process that determines the formation dip at every depth of the log. In examples, the formation dip correction may be window based or edge based.

In block 506 a user may construct a window of size "H" at the predetermined depth steps, which is a window-based alignment method and may include predetermining the location of the window centers. In examples, "H" is the height chosen for review. A smaller height may provide high resolution while a larger height may have low resolution with stable results. The larger height window contains more formation information than the smaller height window, thus, some information may be overshadowed in the larger height window.

In block 508 the corrected data from block 506 is transformed into a frequency domain. In examples, the transformation may be achieved by using a fast Fourier transform (FFT). In block 510, a number of center frequencies based on a maximum frequency are determined. Based on the maximum frequency, the entire frequency spectrum may be split into, for example, 5 smaller section that each have individual center frequencies.

In block 512, the measured data is filtered with an adaptive filter, in this example a band-pass filter, with center frequency "f." This may be performed as seen in Equations 1 to 5 above. In block 514, the semblance between reference and target datasets is computed over a range of relative shift.

In block 516 a last center frequency is found as an iteration over all center frequencies. In block 518 a band-pass filter (the adaptive filter of Equation (2)) may be created with a new center frequency if the last center frequency is not found in block 516. In block 520 the semblances data is assembled. By filtering the data with different adaptive filter, there may be different sets of calculated semblance between reference and target datasets over the same range of relative shift. In block 520 the semblances values are arranged either through stacking or a histogram. In block 522 the relative pad shift is selected. By either choosing a method for stacking or a histogram to be used to assembly the semblance values, the relative pad shift in block 522 may be determined by identifying a maximum semblance value (for stacking) or maximum occurrence (for histogram). In block 524 a last window is found. For the larger window, the results are more stable as a larger depth of the formation is considered whereas for the smaller windows the results are more influenced by an aliasing effect. In the larger window, it is possible that some small and fine details may be overshadowed by the overall background information contained in the larger window. However, the smaller window may be used to allow small and fine details contribute more in the semblance value. In general, the user may begin with the larger window and follow with the smaller window processing in order to achieve overall improvement in the results, as seen in block 526. In block 526 a new window size "H" & relative shift step are found if the last window in block 524 is not found. In block 528 an output is found.

Figures 6A, 6B, 6C, 6D:
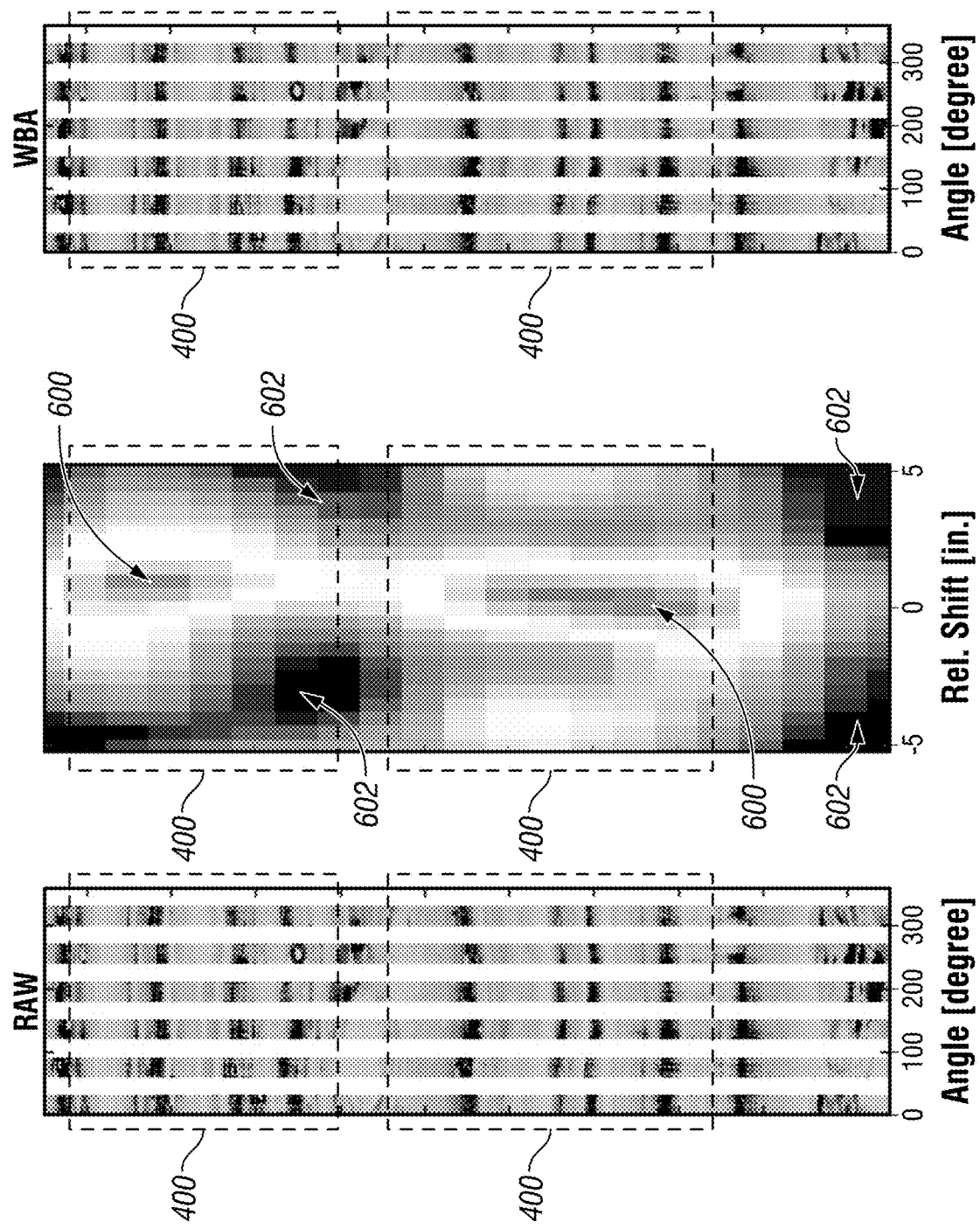
FIGS. 6A-6D illustrate corrected image using the workflow for pad alignment.
Figure 7D:
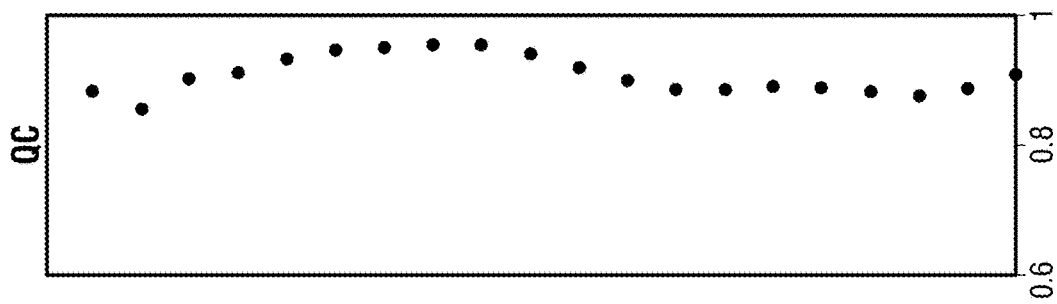
FIGS. 7A-7D illustrates another corrected image using the workflow for pad alignment.
Figure 7C:
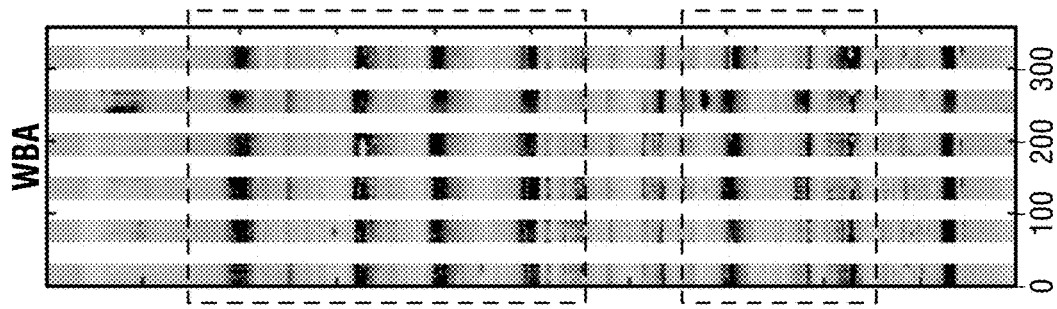
Figure 7B:
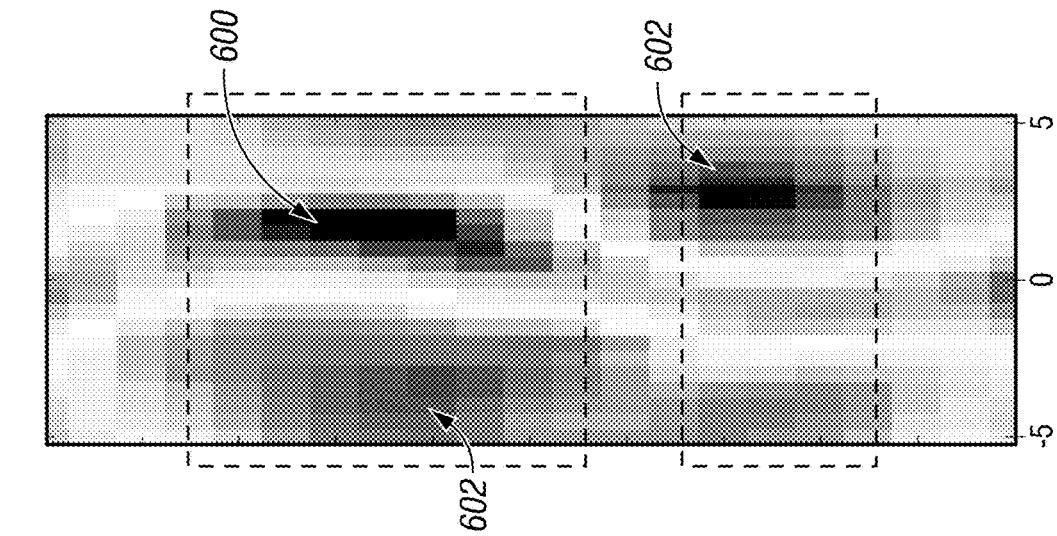
Figure 7A:
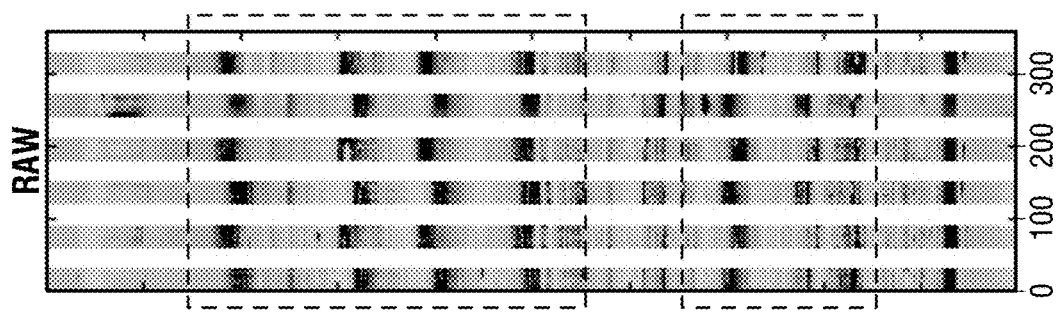

FIGS. 6A-6D and 7A-7D show the results of workflow 500. FIG. 4A is reproduced as FIG. 6A with misalignment areas 400. FIG. 6C illustrates a corrected image from FIG. 6A, after a pad alignment correction using workflow 500. Additionally, FIG. 4B is reproduced as FIG. 7A with misalignment areas 400. FIG. 7C illustrates a corrected image from FIG. 7A, after a pad alignment correction using workflow 500. FIGS. 6B and 7B illustrate a semblance map that indicate the relative pad shift for the target pads. Section 600 indicates the high semblance value which also represent high confidence that there is a match between target and reference pads while section 602 represents poor matched results between target and reference pads. If the auto adjustment is unsatisfactory, blocks 514-518 of FIG. 5, the user mays refer back to the semblance to detect check for possible multiple solutions and make manual adjustment accordingly.

FIGS. 6D and 7D illustrate maximum semblance values that may be extracted from the semblance map. FIGS. 6D and 7D are quality indicators of the pad shift adjustment obtained from the proposed method. In FIGS. 6D and 7D, the first and second threshold values have been set to 0.6 and 0.8, respectively, for quality indicator purpose. The semblance value greater than the second threshold value, (i.e. 0.8) is indicated good alignment achieved by the proposed workflow while the semblance values between first and second threshold are regions that need attention and visual inspection from the user.

The systems and methods may include any of the various features of the systems and methods disclosed herein, including one or more of the following statements.

Statement 1. A method for pad alignment may comprise disposing a downhole tool into a borehole. The borehole tool may comprise a mandrel, wherein the mandrel is a structural support for the downhole tool, one or more pads, wherein the one or more pads are connected to the mandrel, and one or more electrodes, wherein the one or more electrodes are disposed on each of the one or more pads. The method may further comprise taking a measurement with the electrode with at least one operating frequency, correcting the measurement to account for local formation dip, constructing a window with a predetermined size H, identifying one or more adaptive filters to be utilized, extracting one or more frequency components from the measurement with the one or more adaptive filters, identifying a semblance value of a reference dataset and a target dataset, assembling the semblance values for the reference dataset and the target dataset, identifying the semblance values of the reference dataset and target datasets over a range of relative pad shifts, identifying a pad shift, and forming one or more images of the pad shift or the semblance of the reference dataset and target dataset.

Statement 2. The method of statement 1, further comprising repeating constructing the window with a second size H.

Statement 3. The method of statement 2, wherein the window determines a resolution.

Statement 4. The method of statement 1 or 2, wherein identifying the semblance values is performed through a stacking procedure, wherein a maximum semblance value gives the relative pad shift.

Statement 5. The method of statement 4, wherein one or more adaptive weights are applied during the stacking procedure to suppress noise.

Statement 6. The method of statements 1 or 4, wherein identifying the semblance values is performed through constructing a histogram of the semblance values, wherein a maximum occurrence gives the relative pad shift.

Statement 7. The method of statements 1, 4, or 6, further comprising constructing the one or more adaptive filters with a center frequency.

Statement 8. The method of statement 7, further comprising filtering the measurement with the one or more adaptive filters with the center frequency.

Statement 9. The method of statements 1, 4, 6, or 7, further comprising identifying a first threshold and a second threshold.

Statement 10. The method of statement 9, further comprising performing a quality control on the semblance value based at least in part on the first threshold and the second threshold.

Statement 11. The method of statements 1, 4, 6, 7, or 9, further comprising transforming the measurement to a frequency domain.

Statement 12. A system may comprise a downhole tool. The downhole tool may comprise a mandrel, wherein the mandrel is a structural support for the downhole tool, one or more pads, wherein the one or more pads are connected to the mandrel, and one or more electrodes, wherein the one or more electrodes are disposed on each of the one or more pads and are configured to take a measurement. The system may further comprise an information handling system configured to correct the measurement to account for local formation dip, construct a window with a predetermined size H, identify one or more adaptive filters to be utilized, extract one or more frequency components from the measurement with the one or more adaptive filters, identify a semblance value of a reference dataset and a target dataset, assemble the semblance values for the reference dataset and the target dataset, identify the semblance values of the reference dataset and target datasets over the range of relative pad shifts, identify a pad shift, and form one or more images of the pad shirt or the semblance of the reference dataset and target data set.

Statement 13. The system of statement 12, wherein the information handling system is further configured to repeat construct the window with a second size H.

Statement 14. The system of statement 13, wherein the window determines a resolution.

Statement 15. The system of statements 12 or 13, wherein the information handling system is further configured to identify the semblance values is performed through a stacking procedure, wherein a maximum semblance value gives the relative pad shift.

Statement 16. The system of statement 15, wherein one or more adaptive weights are applied during the stacking procedure to suppress noise.

Statement 17. The system of statements 12, 13, or 15, wherein the information handling system is further configured to identify the semblance values is performed through constructing a histogram of the semblance values, wherein a maximum occurrence gives the relative pad shift.

Statement 18. The system of statements 12, 13, 15, or 17 wherein the information handling system is further configured to construct the one or more adaptive filters with a center frequency.

Statement 19. The system of statement 18, wherein the information handling system is further configured to filter the measurement with the one or more adaptive filters with the center frequency.

Statement 20. The system of statements 12, 13, 15, 17, or 18 wherein the information handling system is further configured to identify a first threshold and a second threshold and perform a quality control on the semblance value based at least in part on the first threshold and the second threshold.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for pad alignment comprising:
   disposing a downhole tool into a borehole, wherein the downhole tool comprises:
   a mandrel, wherein the mandrel is a structural support for the downhole tool;
   two or more pads, wherein the two or more pads are connected to the mandrel and the two or more pads are split into a first set of pads and a second set of pads; and
   one or more electrodes, wherein the one or more electrodes are disposed on each of the two or more pads;

taking a measurement at the first set of pads and the second set of pads with the one or more electrodes with at least one operating frequency;

correcting the measurement to account for local formation dip;

constructing a window with a predetermined size H;

identifying a center frequency for each of the two or more pads from the measurements at the first set of pads and the second set of pads;

constructing an adaptive filters for each of the two or more pads based on the center frequency for each of the two or more pads;

applying the adaptive filter to the measurements at the first set of pads and the second set of pads;

extracting one or more frequency components from the measurement with the adaptive filters for each of the two or more pads;

identifying a semblance value of a reference dataset and a target dataset, where the reference data set is the measurements from the first set of the two or more pads and the target dataset is the measurements from the second set of the two or more pads;

assembling the semblance value for the reference dataset and the target dataset;

identifying the semblance value of the reference dataset and target dataset over a range of relative pad shifts;

identifying a pad shift; and forming one or more images of the pad shift or the semblance of the reference dataset and target dataset.

2. The method of claim 1, further comprising repeating constructing the window with a second predetermined size H.

3. The method of claim 2, wherein the window determines a resolution.

4. The method of claim 1, wherein identifying the semblance value is performed through a stacking procedure, wherein a maximum semblance value gives the relative pad shift.

5. The method of claim 4, wherein one or more adaptive weights are applied during the stacking procedure to suppress noise.

6. The method of claim 1, wherein identifying the semblance value is performed through constructing a histogram of the semblance values, wherein a maximum occurrence gives the relative pad shift.

7. The method of claim 1, further comprising identifying a first threshold and a second threshold.

8. The method of claim 7, further comprising performing a quality control on the semblance value based at least in part on the first threshold and the second threshold.

9. The method of claim 1, further comprising transforming the measurement to a frequency domain.

10. A system comprising:
a downhole tool comprising:
a mandrel, wherein the mandrel is a structural support for the downhole tool;
two or more pads, wherein the two or more pads are connected to the mandrel and the two or more pads are split into a first set of pads and a second set of pads; and
one or more electrodes, wherein the one or more electrodes are disposed on each of the two or more pads and are configured to take a measurement;
an information handling system configured to:
correct the measurement to account for local formation dip;
construct a window with a predetermined size H;
identify one or more adaptive filters to be utilized;
identify a center frequency for each of the two or more pads from the measurement at the first set of pads and the second set of pads;
construct an adaptive filter for each of the two or more pads based on the center frequency for each of the two or more pads;
apply the adaptive filter to the measurement at the first set of pads and the second set of pads;
extract one or more frequency components from the measurement with the adaptive filters for each of the two or more pads;
identify a semblance value of a reference dataset and a target dataset where the reference data set is the measurements from the first set of the two or more pads and the target dataset is the measurements from the second set of the two or more pads;
assemble the semblance value for the reference dataset and the target dataset;
identify the semblance value of the reference dataset and target dataset over a range of relative pad shifts;
identify a pad shift; and
form one or more images of the pad shift or the semblance of the reference dataset and target data set.

11. The system of claim 10, wherein the information handling system is further configured to repeat construct the window with a second predetermined size H.

12. The system of claim 11, wherein the window determines a resolution.

13. The system of claim 10, wherein the information handling system is further configured to identify the semblance value is performed through a stacking procedure, wherein a maximum semblance value gives the relative pad shift.

14. The system of claim 13, wherein one or more adaptive weights are applied during the stacking procedure to suppress noise.

15. The system of claim 10, wherein the information handling system is further configured to identify the semblance value is performed through constructing a histogram of the semblance values, wherein a maximum occurrence gives the relative pad shift.

16. The system of claim 10, wherein the information handling system is further configured to identify a first threshold and a second threshold and perform a quality control on the semblance value based at least in part on the first threshold and the second threshold.

17. The system of claim 10, wherein the information handling system is further configured to transform the measurement to a frequency domain.

18. The system of claim 10, wherein the information handling system is further configured to construct the window with a second predetermined size H that determines a resolution and identify the semblance value is performed through a stacking procedure.

19. The system of claim 18, wherein the information handling system is further configured wherein a maximum semblance value gives the relative pad shift.

20. The system of claim 19, wherein the information handling system is further configured wherein one or more adaptive weights are applied during the stacking procedure to suppress noise.

* * * * *